United States Patent
Cavanna

[11] 3,720,565
[45] March 13, 1973

[54] DEVICE FOR LONGITUDINALLY WELDING TAPES OF PLASTICS MATERIAL - IN PACKAGING MACHINES

[76] Inventor: Mario Cavanna, Via Antonelli, 24, Romagnano Sesia (Novara), Italy

[22] Filed: June 29, 1970

[21] Appl. No.: 50,727

[52] U.S. Cl. ..................156/497, 53/373, 156/306
[51] Int. Cl. ..............................................B65b 51/20
[58] Field of Search ................156/497; 53/372, 373

[56] References Cited

UNITED STATES PATENTS

| | | | |
|---|---|---|---|
| 3,278,358 | 10/1966 | Rosewicz et al. | 156/497 X |
| 2,606,850 | 8/1952 | Piazze | 53/372 |
| 3,355,857 | 12/1967 | Tobey | 53/373 X |
| 2,913,863 | 11/1959 | Sylvester et al. | 53/373 |
| 2,678,679 | 5/1954 | Bergstein | 156/497 X |
| 3,340,678 | 9/1967 | Rhodes | 156/497 X |
| 3,385,028 | 5/1968 | Pierce | 156/497 X |

Primary Examiner—Ralph S. Kendall
Attorney—Sherman and Shalloway

[57] ABSTRACT

A device for longitudinally welding tapes of plastics material in packaging machines, which comprises, pulleys on a plate-like element which may be adjusted in level, at least some of said pulleys being driving pulleys and rotatably mounted with preferably vertical axis, on the said pulleys two pairs of endless belts being taken up, which have straight sections tangent between the said pulleys at the welding zone in order to clamp therebetween the edges of the tape of plastics material to be welded, the said belts being overlapped at a short distance from one another in number of two at each side with respect to the said welding zone, in such a manner as to define a narrow strip at which at least one nozzle is mounted to blow hot air.

3 Claims, 3 Drawing Figures

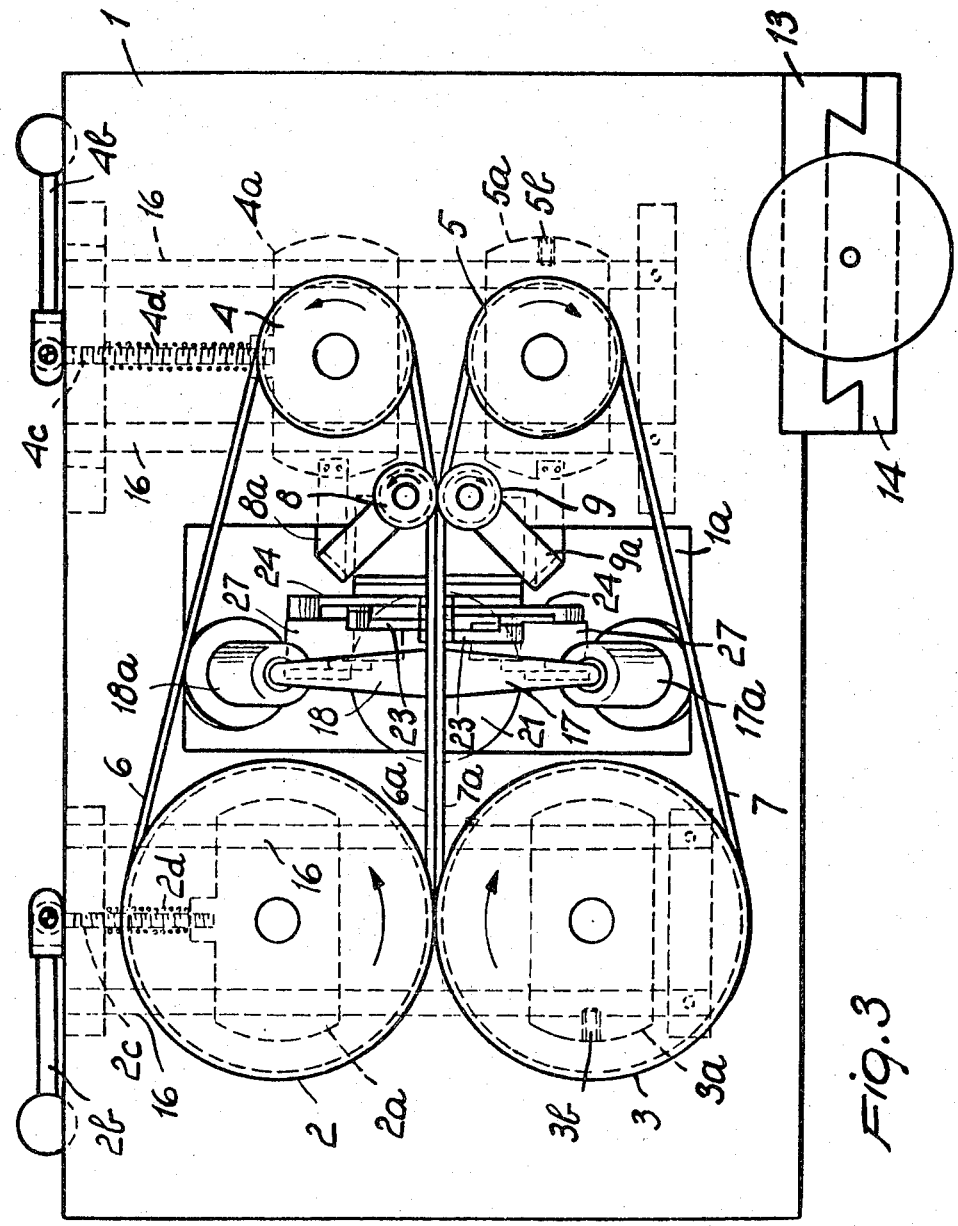

DEVICE FOR LONGITUDINALLY WELDING TAPES OF PLASTICS MATERIAL - IN PACKAGING MACHINES

BACKGROUND OF THE INVENTION

The present invention relates to a device for longitudinally welding tapes of plastics material to be used in packaging machines.

In a prior art devices, opposite rollers are provided to actuate the packaging tape of plastics material, which are connected to nozzle means for directly blowing hot air so as to obtain a longitudinal welding along the edges of the tape.

It was found that such a device could be improved so as to obtain a better actuation of the plastic tape and a more rational and efficient welding system.

The main object of the present invention is thus that of conceiving an improved device for longitudinally welding tapes of plastic material, so as to obtain more efficient and accurate packaging machines.

Another important object of the invention is that of conceiving a device arranged to define a well delimited and regular welding line or strip.

Another object of the invention is that of providing adjusting means of easy use in the various operative stages of the welding members.

Summary of the Invention

These and still further objects are attained by the device for longitudinally welding tapes of plastics material according to the invention, which is characterized in that it comprises pulleys on a plate-like element which may be adjusted in level, at least some of said pulleys being driving pulleys and rotatably mounted with preferably vertical axis, on the pulleys two pairs of endless belts being taken up, which have straight sections tangent between the pulleys at the welding zone in order to clamp therebetween the edges of the tape of plastics material to be welded, the belts being overlapped at a short distance from one another in number of two at each side with respect to the welding zone, in such a manner as to define a narrow strip near which at least one nozzle is mounted to blow hot air.

BRIEF DESCRIPTION OF THE DRAWINGS

Further characteristics and advantages of the invention will better appear from the following detailed description of a preferred nonlimitive embodiment of a device for longitudinally welding tapes of plastics material, according to the invention, as illustrated by way of the accompanying drawings, in which:

FIG. 3 is a top view of the device for longitudinally welding according to the invention.

DESCRIPTION OF THE PREFERRED EMBODIMENTS

Figure 1:
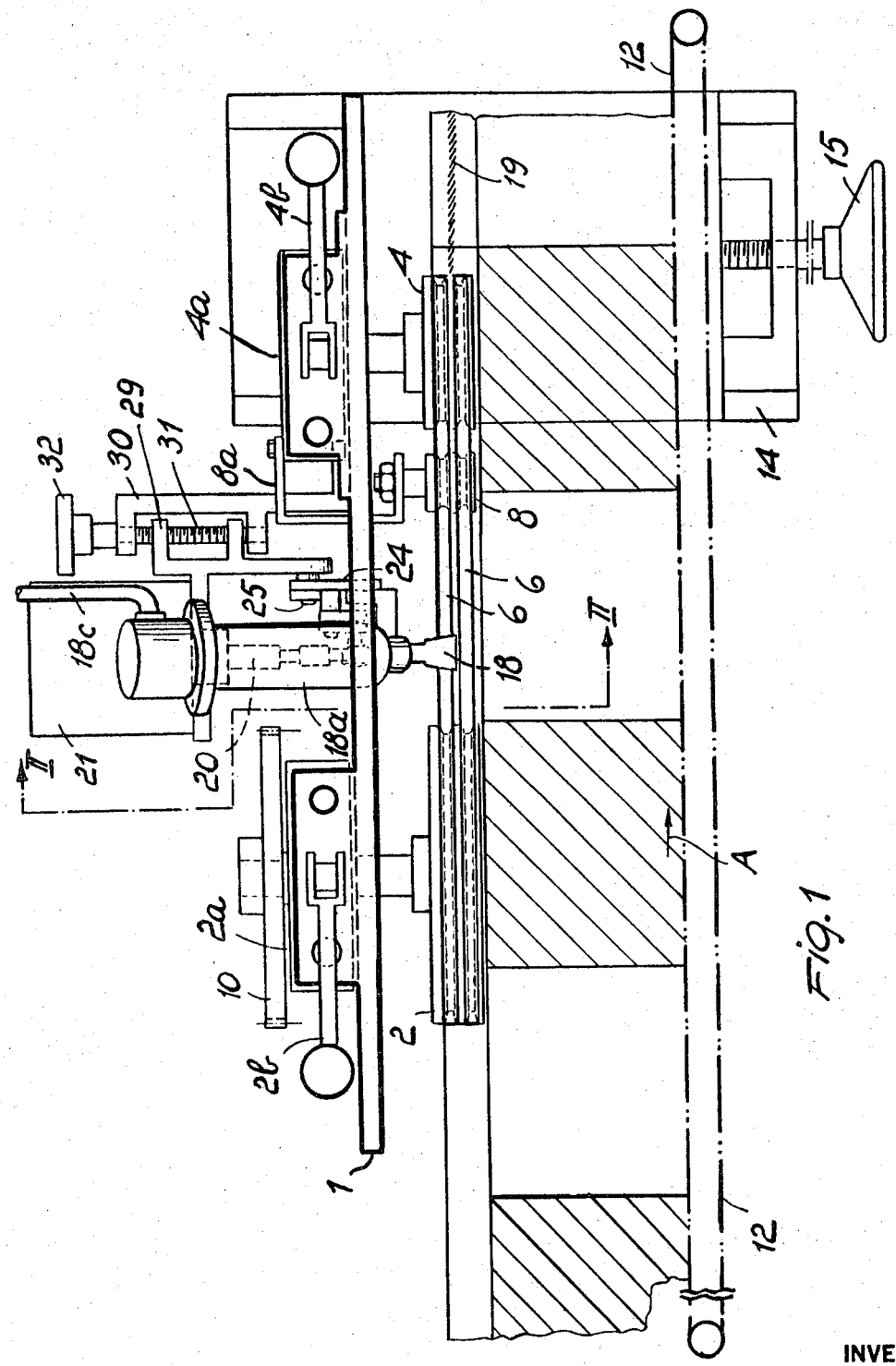
FIG. 1 is a side-view of the device for longitudinally welding according to the invention.
Figure 2:
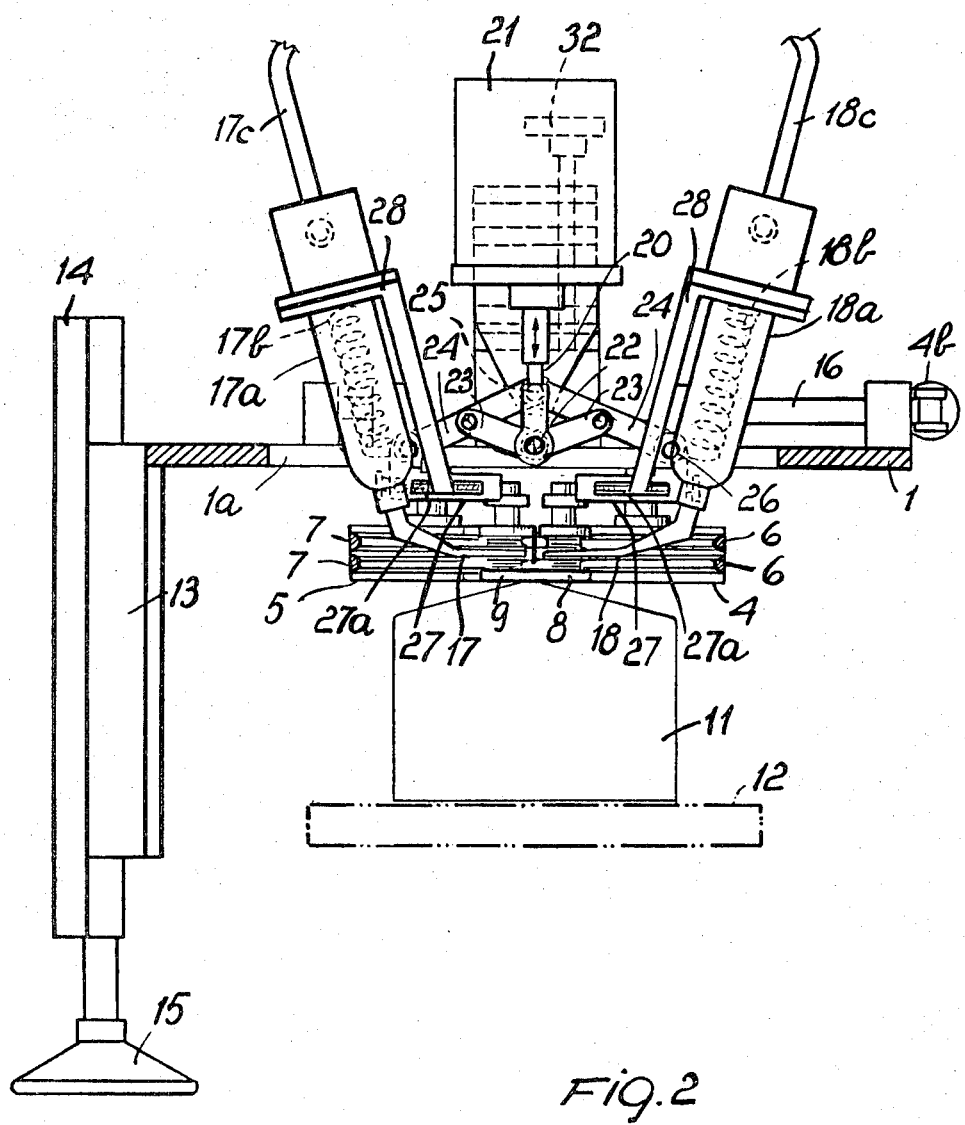
FIG. 2 is a section taken along the line II — II of FIG. 1.

With reference to the above FIGS., the device for longitudinally welding, according to the invention, comprises a plate 1 which may be adjusted in level and supports the various members necessary for carrying out a longitudinal welding on the tapes of thermosetting material, which have been previously bent into a tubular shape. The plate 1 has an opening or window 1a.

More precisely, below the plate 1 two driving pulleys 2 and 3 and two idle pulleys 4 and 5 are mounted on which V-belts 6 and 7 are wound. Furthermore each of the pulleys 2, 3, 4 and 5 has two grooves arranged to receive two belts so that four V-belts are thus mounted, two on the pulleys 2 and 4 and two on the pulleys 3 and 5. Such pairs of belts 6 and 7 are also wound on the two other pulleys 8 and 9 having a small diameter and acting as belt-stretchers. They also have a double groove and are idly rotatably mounted one opposite to the other.

The arrangement is such as the V-belts 6 and 7 have straight sections 6a and 7a respectively, adjacent to one another in the space between the pulleys 2 and 3 and the pulleys 8 and 9 (FIG. 3). Furthermore the two grooves of each of the pulleys are slightly spaced from one another so that the belts 6 and 7 are overlapped with a small space therebetween.

In this way the sections 6a and 7a of the said belts can clamp therebetween the edges of the plastic material sheet to be welded thus defining a short strip thereof.

A gear 10 is shown in FIG. 1 and is arranged to rotate the pulley 2. Such gear is keyed on a shaft carrying the same pulley and meshes with a pinion (not shown) slidably mounted on a grooved shaft (not shown) and receiving the movement transmitted by other driving means. The pulley 3 is caused to rotate at the same rotational speed by means of similar transmission means.

The sheet 11 of the thermo-setting material which is wrapped substantially into a tubular shape, rests on a conveyor belt 12 which is arranged horizontally in a fixed position below the plate 1. Since it is necessary to be able to vary the distance between the belt 12 and the plate 1 as a function of the thickness of the products to be packaged, there is provided that the plate 1 can be vertically moved in order to vary the level of the belts 6 and 7 from the upper surface of the belt 12. To this end the plate 1 is fixed to a slide bracket 13 which is mounted vertically sliding on a fixed guide 14. The movement is caused through a hand-wheel 15 which is rigid with a vertical screw co-operating with the said slide 13. The movement of the pulleys 2 and 3 is continuously transmitted since, as said hereinabove, the pinion meshing with the tooth-wheel 10 and also the pinion meshing with the other tooth-wheel co-operating with the pulley 3 are slidably mounted on the vertical grooved shaft.

The shafts of the pulleys 2,3,4 and 5 are rotatably mounted on respective supports 2a, 3a, 4a, 5a which are mounted on horizontal guides 16. The supports 3a, and 5a are secured to the guides 16 by means of security dowels 3b, 5b, while the supports 2a and 4a are slidably mounted on the same guides. The movement of such supports 2a and 4a is caused by the eccentric levers 2b and 4b connected to the same supports through pins 2c and 4c, on which the respective springs 2d and 4d are provided. By operating the said levers 2b and 4b it is possible to move the rollers or pulleys 2 and 4 from the pulleys 3 and 5, so as to permit the plastic sheet 11 to be initially inserted during the starting stage of the machine.

The pulleys 8 and 9 are connected to a support 4a and 5a respectively, through relative lugs 8a and 9a. By moving then the support 4a along the guides 16 the two pulleys 4 and 8 are caused to move at the same time.

At the gap defined by the superimposed pairs of belts 6 and 7, in the adjacent sections 6a and 7a, two nozzles 17 and 18 are provided for blowing hot air in order to cause the welding of the top edges of the formed sheet 11. Such nozzles 17 and 18 are connected to relative heating chambers 17a and 18a in which incandescence resistors 17b and 18b are placed. In these chambers air is supplied by pipes 17c and 18c. With such an arrangement the cold air from the pipes or ducts 17c and 18c after heating thereof is supplied to the nozzles 17 and 18 and blown onto the adjacent edges of the plastic sheet 11, thus obtaining a continuous longitudinal welding thereof. This welding, indicated at 19 in FIG. 1 has a constant width corresponding to the distance between the overlapped pairs of belts 6 and 7.

During the operation a short or a long stop of the packaging machines may be required and in this case the plastic sheet tape 11 pairs of belts 6 and 7 could be damaged by the prolonged and local action of the hot air. This inconvenience can be avoided in the manner described hereinbelow.

The nozzles 17 and 18 are connected through a linking system to a rod 20 which is rigid with the mobil core of a solenoid 21. The rod 20 is vertically arranged and toggle-jointed at 26 to a block 27 formed with a groove 27a. In this groove an end portion of a relative support 28 is slidable mounted. Two supports 28 for the groups of nozzles 17 and 18 are thus provided. By acting on screws it is possible to move each support 28 relatively to the respective block 27 so that to adjust the distance of the nozzles 17 and 18 with respect to the adjacent edges of the sheet 11 to be welded. When the solenoid 21 is actuated, rod 20 raises and the levers 24 rotate around a fixed point 25 thus moving nozzles 17 and 18 away from the edges of the sheet 11 to be welded as blocks 27 move away from one another.

When the solenoid 21 is actuated, the air is plied through an electro-valve (not shown). A switching relay (not shown) is also provided which cuts off the resistors 17b and 18b from the normal voltage source and connect them to a reduced voltage source, and at the same time actuates the electro-valve in order to prevent the burn-out of the resistor which thus would not be air cooled due to the break in the air flow. The reduced voltage permits the resistors 17b and 18b to be kept at such a temperature that upon the subsequent starting of the machine the temperature increase to the normal operative condition does not require a too long time. In order to adjust the nozzles 17 and 18 to the proper level with respect to the belts 6 and 7, the solenoid 21 is not directly secured to the plate 1, but is slidably mounted in a vertical direction by means of two forks 29 and 30 which are fixed to the solenoid 21 and to the plate 1, respectively.

Such forks are connected to one another by means of a screw 31 which is provided with a hand-wheel 32 through which solenoid 21 may be adjusted in level.

The device according to the invention is further provided with a flow control (not shown) which is placed upstream from pipes 17c and 18c to control the air amount necessary for the welding operation.

The operation of the above-described device is as follows:

After the plastic sheet 11 has been placed near the edges to be welded between sections 6a and 7a of the belts 6 and 7 by acting on the levers 2b and 4b, the device can start its operation and thus pulleys 2 and 3 start to rotate in the direction indicated by the arrows in FIG. 3. The rotational speed of such pulleys is such as to accompany sheet 11 which is carried by the conveyor belt 12 in the direction of the arrow A of FIG. 1. The V-belts 6 and 7 transport the adjacent edges of the sheet 11 and hold the same constantly in contact and slightly pressed against one another. The relative pressure between the edges is quite necessary in order to obtain a resistant welding. As it is known in fact a good welding may be obtained not only by suitably controlling the temperature but also by pressing action immediately after the fusion.

The belts 6 and 7 precisely define the welding strip which is particularly useful in order to obtain an even welded strip of a small width (indicated at 19 in FIG. 1). Should the welding zone not be precisely limited by the belts 6 and 7, the hot air-jets from the nozzles 17 and 18 will impinge on the obstacle consisting of the edges to be welded and thus will be scattered and enlarged, and a large welded strip will be obtained. The latter strip however would be resistant only along an intermediate zone which would be quite narrow and very unsatisfactory from the esthetical point of view.

When the packaging machine is stopped the solenoid 21, the electro-valve arranged to cut off the supplying of air and the switching relay arranged to reduce the voltage applied to the registers 17b and 18b are automatically actuated.

In this way the nozzles 17 and 18 are moved away from the adjacent edges of the sheet 11, while the air supply through the ducts 17c and 18c is cut off and the supplying voltage of the resistors 17b and 18b is diminished. This will prevent the burn-out of the resistors which are not cooled by the air coming from the ducts 17c – 18c and any damage to the plastic sheet. As stated above the calibration of the position of the nozzles 17 and 18 in the horizontal direction may be effected by acting on screws in order to move the lower portions of supports 28 placed within the grooves of the blocks 27 and in the vertical direction by acting on the hand-wheel 32 in order to vertically move solenoid 21 which supports the whole unit of the nozzles 17 and 18 through point 25 which is fixed to the housing of the solenoid 21.

It should be noted that the device according to the invention provides a longitudinal welding of very good adhercence this being particularly due to the arrangement of the belts 6 and 7 which press the sections 6a and 7a on the edges to be welded just downstream the nozzles 17 and 18 and provide an even and efficient welding strip.

The invention thus conceived is susceptible to numerous modifications and charges all of which should be considered as included in the scope of the inventive idea.

In practice all the used materials as well as dimensions could be any according to the requirements and furthermore all the elements could be substituted with other technically equivalent means.

I claim:

1. A device for welding the contacting longitudinal edges of thermoplastic film web previously bent into tubular form and continuously moving in a packaging machine on a conveyor belt comprising:

a flat plate;

an opening in said plate;

height adjustment means mounted on said flat plate so that the height of said plate above said conveyor belt may be adjusted to a predetermined level;

a first and a second slide mounted on said plate, each slide having two parallel guides, said guides being perpendicular to the direction of travel of said conveyor belt;

a first and second pully each rotatably mounted on a first and second support respectively, said first and second supports being mounted on said first slide, said first and second pulleys forming a first pair of pulleys;

a third and fourth pully each rotatably mounted on a third and fourth support respectively, said third and fourth supports being mounted on said second slide, said third and fourth pulleys forming a second pair of pulleys, each of said four pulleys having two axially spaced peripheral grooves and being mounted so that each pully is the same distance above said conveyor belt; at least one of said pairs of pulleys being driven; said first pair of pulleys being larger than said second pair of pulleys;

a fifth and sixth pully rigidly mounted on said third and fourth supports intermediate said first and second pairs of pulleys and mounted the same distance above said conveyor belt as said third and fourth pulleys, said fifth and sixth pulleys having two axially spaced grooves; two pairs of endless belts mounted on said pulleys in said grooves, said first pair of belts being mounted on said first, third and fifth pulleys and said second pair of belts being mounted on said second, fourth and sixth pulleys, said first and fifth pulleys and said second and sixth pulleys being positioned so that said two pairs of belts form a straight path of travel parallel to the direction of travel of said conveyor belt, said straight path of travel being across said opening;

at least one nozzle mounted on said plate through said opening, said nozzle being positioned to blow hot air perpendicular to said pairs of belts and between each pair of belts;

means for rigidly holding said second and fourth supports in position on said first and second slides respectively; and means for manually moving said first and third supports along said slides in a direction away from said second and fourth supports, said first and third supports being biased toward said second and fourth supports.

2. A device as claimed in claim 1 wherein each of said manual moving means comprises:

a rod connected, at one end thereof, to said support, said rod being parallel to said guides;

a bracket on said plate, a clearance hole in said bracket in alignment with the longitudinal axis of said rod, the free end of said rod being slindingly inserted through said hole;

a pivot on said free end of said rod, the axis of said pivot being perpendicular to the upper and lower surfaces of said plate;

a cam member having a cam surface rotatively mounted on said pivot, said cam member being provided with a lever handle and the cam surface being in engagement with said bracket; and a spring biasing said support away from said bracket and biasing said cam surface of said cam member against said bracket.

3. A device as claimed in claim 1 having two nozzles, said nozzles being positioned on opposite sides of said pairs of endless belts and a mounting means comprising:

a swinging support block for each of said nozzles, said support block being jointed to one end of a respective lever and the other end of which is hinged on pivot located above the upper surface of said plate-like element with respect to the position of said pulleys;

a carriage supporting said pivot, said carriage being provided with guide means and driving means for locating said pivot at a predetermined level with respect to said plate; and electrically operated actuating means mounted on said carriage and connected to said lever by means of an intermediate lever for swinging said support block and nozzle.

* * * * *